(12) United States Patent
Zuranski et al.

(10) Patent No.: US 6,263,077 B1
(45) Date of Patent: Jul. 17, 2001

(54) DIGITAL SUBSCRIBER LINE MODEM UTILIZING ECHO CANCELLATION TO REDUCE NEAR-END CROSS-TALK NOISE

(75) Inventors: Edward S. Zuranski, Largo; Kenneth D. Ko, Clearwater; Jamal Haque, Tampa; Shrenik P. Patravali; Manuel I. Rodriguez, both of St. Petersburg; Keith A. Souders, Tampa; Anthony A. Tzouris, Clearwater, all of FL (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/028,141

(22) Filed: Feb. 23, 1998

Related U.S. Application Data

(63) Continuation-in-part of application No. 08/943,484, filed on Oct. 3, 1997, now Pat. No. 6,101,216.

(51) Int. Cl.[7] .............................. H04B 3/20; H04M 11/00
(52) U.S. Cl. .................... 379/410; 379/93.28; 375/222
(58) Field of Search .................... 379/410, 411, 379/406, 93.01, 93.28, 90.01; 375/222

(56) References Cited

U.S. PATENT DOCUMENTS

| | | |
|---|---|---|
| 3,988,677 | 10/1976 | Fletcher et al. . |
| 4,020,461 | 4/1977 | Adams et al. . |
| 4,333,175 | 6/1982 | Cook et al. . |
| 4,689,783 | 8/1987 | Kaczerowski . |
| 4,700,340 | 10/1987 | Beranek et al. . |
| 4,761,779 | 8/1988 | Nara et al. . |
| 4,766,594 | 8/1988 | Ogawa et al. . |
| 4,799,217 | 1/1989 | Fang . |
| 4,961,186 | 10/1990 | Chandramouli et al. . |
| 5,101,216 | * 3/1992 | Henderson et al. ................ 375/222 |
| 5,132,991 | 7/1992 | McNesby et al. . |
| 5,144,625 | 9/1992 | Cain et al. . |
| 5,243,593 | 9/1993 | Timbs . |
| 5,297,145 | 3/1994 | Havermans . |
| 5,367,540 | 11/1994 | Kakuishi et al. . |
| 5,408,260 | 4/1995 | Arnon . |
| 5,410,343 | 4/1995 | Coddington et al. . |
| 5,442,693 | 8/1995 | Hays et al. . |
| 5,461,616 | 10/1995 | Suzuki . |
| 5,479,447 | 12/1995 | Chow et al. . |
| 5,519,731 | 5/1996 | Cioffi . |
| 5,528,281 | 6/1996 | Grady et al. . |
| 5,534,912 | 7/1996 | Kostreski . |
| 5,559,858 | 9/1996 | Beveridge . |
| 5,592,540 | 1/1997 | Beveridge . |
| 5,596,604 | 1/1997 | Cioffi et al. . |
| 5,625,404 | 4/1997 | Grady et al. . |
| 5,627,501 | 5/1997 | Biran et al. . |

* cited by examiner

Primary Examiner—Wing F. Chan
(74) Attorney, Agent, or Firm—Foley & Lardner

(57) ABSTRACT

A digital subscriber line communication system does not require the use of a plain old telephone service (POTS) splitter in the resident's home. Digital signal-processing techniques are utilized to accommodate varying subscriber line conditions coming from POTS telephone equipment. The digital signal-processing techniques eliminate the need for a splitter by reducing susceptibility to distortion resulting from varying subscriber line characteristics. The digital subscriber line modem can utilize quadrature amplitude modulated (QAM) signals and frequency division multiplexing. The digital subscriber line modem includes a control circuit that implements an echo canceler and an analyzer to reduce near-end cross-talk noise. The analyzer performs spectral analysis to preemphasize or to predistort the transmitted signals in accordance with the cross-talk noise.

20 Claims, 7 Drawing Sheets

DIGITAL SUBSCRIBER LINE MODEM UTILIZING ECHO CANCELLATION TO REDUCE NEAR-END CROSS-TALK NOISE

CROSS REFERENCE TO RELATED PATENT APPLICATIONS

The present application is a continuation-in-part of U.S. Ser. No. 08/943,484, filed Oct. 3, 1997, now U.S. Pat. No. 06/101,216, by Henderson et al., entitled SPLINTERLESS DIGITAL SUBSCRIBER LINE COMMUNICATION SYSTEM.

FIELD OF THE INVENTION

The present invention relates generally to communication systems. More particularly, the present invention relates to a system for and a method of reducing noise on a subscriber line.

BACKGROUND OF THE INVENTION

Explosive growth of the internet and the worldwide web is driving a need for increased communication data rates. In the corporate world, the need for high-speed access or data rates is met by dedicated high-speed links (perhaps T1/E1 frame relays or OC1 ATM systems) from the company to an internet access provider. Users in the company utilize a local area network (LAN) to gain access to an internet access router, which is attached to the high-speed link. Unfortunately, home-users of the internet do not often have a high-speed link and must rely on standard analog or plain old telephone service (POTS) line.

The need for high-speed access to the home is ever increasing due to the availability of information, data, programs, entertainment, and other computer applications on the worldwide web and on the internet. For example, designers of web technology are constantly developing new ways to provide sensory experiences, including audio and video, to users of the web (web surfers). Higher-speed modems will be required so the home-user can fully interact with incoming web and communication technologies.

Although designers of modems are continuously attempting to increase data rates, analog or POTS line modems are presently only able to reach data rates of up to 56 kilobits per second (Kbps). These conventional analog modems transmit and receive information on POTS subscriber lines through the public-switched telephone network. The internet access provider is also coupled to the switched telephone network and transmits and receives information through it to the subscriber line.

Some home-users have utilized integrated digital services network (ISDN) equipment and subscriptions to obtain up to 128 Kbps access or data rates by the use of 2 B channels. ISDN equipment and subscriptions can be expensive and require a dedicated subscriber line. Heretofore, neither ISDN modems nor analog modems are capable of providing 256 Kbps or higher access between the home and the internet. Over one megabit per second (Mbps) data rates with analog modems or ISDN equipment do not seem feasible at this time.

A variety of communication technologies are competing to provide high-speed access to the home. For example, asymmetric digital subscriber lines (ADSL), cable modems, satellite broadcast, wireless LANs, and direct fiber connections to the home have all been suggested. Of these technologies, the asymmetric digital subscriber line can utilize the POTS subscriber line (the wire currently being utilized for POTS) between the home-user (the residence) and the telephone company (the central office).

ADSL networks and protocols were developed in the early 1990's to allow telephone companies to provide video-on-demand service over the same wires which were being used to provide POTS. ADSL technologies include discrete multitone (DMT), carrierless amplitude and phase modulation (CAP), VHDL, and other technologies. Although the video-on-demand market has been less than originally expected, telephone companies have recognized the potential application of ADSL technology for internet access and have begun limited offerings.

ADSL technology allows telephone companies to offer high-speed internet access, while removing internet traffic from the telephone switch network. Telephone companies cannot significantly profit from internet traffic in the telephone switch network due to regulatory considerations. However, the telephone company can charge a separate access fee for ADSL services. The separate fee is not as restricted by regulatory considerations.

With reference to FIG. 1, a conventional asymmetric ADSL (ADSL) system 10 includes a copper twisted pair analog subscriber line 12, an ADSL modem 14, an ADSL modem 16, a band splitter 18, and a band splitter 20. Line 12 is a POTS local loop or wire connecting a central office 32 of the telephone company to a user's residence 22.

ADSL modem 14 is located in user's residence 22 and provides data to and from subscriber line 12. The data can be provided from line 12 through modem 14 to various equipment (not shown) coupled to modem 14. Equipment, such as, computers, network devices, servers, or other devices, can be attached to modem 14. Modem 14 communicates with a data network (not shown) coupled to modem 16 across line 12. ADSL modem 16 receives and transmits signals from and to line 12 to modem 14. The data network can be coupled to other networks (not shown), including the internet.

At least one analog telephone 26, located in residence 22, can be coupled to subscriber line 12 through splitter 20 for communication across line 12 with telephone switch network 28. Telephone 26 and telephone switch network 28 (e.g., public-switched telephone (PST) network) are conventional systems well-known in the art. Alternatively, other analog equipment, such as, facsimile machines, POTS modems, answering machines, and other telephonic equipment, can be coupled to line 12 in user's residence 22.

System 10 requires that band splitter 18 and band splitter 20 be utilized to separate higher frequency ADSL signals and lower frequency POTS signals. For example, when the user makes a call from residence 22 on telephone 26, lower frequency signals (under 4 kilohertz (kHz)) are provided through band splitter 20 to subscriber line 12 and through band splitter 18 to telephone switch network 28 in central office 32. Band splitter 18 prevents the lower frequency POTS signals from reaching ADSL modem 16. Similarly, band splitter 20 prevents any of the POTS signals from reaching modem 14.

ADSL modem 16 and ADSL modem 14 communicate higher frequency ADSL signals across subscriber line 12. The higher frequency ADSL signals are prevented from reaching telephone 26 and telephone switch network 28 by band splitters 20 and 18, respectively. Splitters 18 and 20 can be passive analog filters or other devices which separate lower frequency POTS signals (below 4 kHz) from higher frequency ADSL signals (above 50 kHz).

The separation of the POTS signals and the ADSL signals by splitters 18 and 20 is necessary to preserve POTS voice and data traffic and ADSL data traffic. More particularly, splitters 18 and 20 can eliminate various effects associated with POTS equipment which may affect the transmission of ADSL signals on subscriber line 12. For example, the impedance of subscriber line 12 can vary greatly as at least one telephone 26 is placed on-hook or off-hook. Additionally, the changes in impedance of subscriber line 12 can change the ADSL channel characteristics associated with subscriber line 12. These changes in characteristics can be particularly destructive at the higher frequencies associated with ADSL signals (e.g., from 30 kHz to 1 megahertz (MHz) or more).

Additionally, splitters 18 and 20 isolate subscriber line wiring within residence 22. The impedance of such wiring is difficult to predict. Further still, the POTS equipment, such as, telephone 26, provides a source of noise and nonlinear distortion. Noise can be caused by POTS voice traffic (e.g., shouting, loud laughter, etc.) and by POTS protocol, such as, the ringing signal. The nonlinear distortion is due to the nonlinear devices included in conventional telephones. For example, transistor and diode circuits in telephone 26 can add nonlinear distortion and cause hard clipping of ADSL signals. Telephone 26 can further generate harmonics which can reach the frequency ranges associated with the ADSL signals. The nonlinear components can also demodulate ADSL signals to cause a hiss in the audio range which affects the POTS.

Conventional ADSL technology has several significant drawbacks. First, the costs associated with ADSL services can be quite high. Telephone companies incur costs related to the purchase of central office equipment (ADSL modems and ADSL network equipment) and to the installation of such equipment. Residential users incur subscriber equipment costs (ADSL modems) and installation costs.

Installation costs are particularly expensive for the residential user because trained service personnel must travel to residence 22 to install band splitter 20 (FIG. 1). Although band splitter 18 must be installed at the central office, this cost is somewhat less because service personnel can install band splitter 18 within central office 32. Also, at office 32, splitter 18 can be included in ADSL modem 16. However, in residence 22, splitter 20 must be provided at the end of subscriber line 12.

Additionally, ADSL equipment for the residence, such as, modem 14, is expensive because the most complex component of modem 14 (e.g., the receiver) is located at residence 22, since high-speed transmissions are generally received within residence 22 (e.g., are downstream), and lower-speed transmissions are received by central office 32 (e.g., are upstream). In most internet applications, larger amounts of data are requested by the residential user rather than by the internet source. Receivers are typically much more complex than transmitters. These high-speed receivers often receive data at rates of over 6 Mbps.

ADSL equipment can also be subject to cross-talk noise from other subscriber lines situated adjacent to subscriber line 12. For example, subscriber lines are often provided in a closely contained bundle. The close containment can cause cross-talk from other subscriber lines to be placed on subscriber line 12.

More particularly, cross-talk noise from upstream traffic in high-speed communication systems, such as, system 10, can be an especially significant problem because such traffic often originates from different points on the subscriber lines. Accordingly, the signals associated with the traffic in different lines can vary greatly in amplitude at the same point. This variation in amplitude accentuates problems associated with cross-talk noise.

Heretofore, some conventional ADSL systems limit the upstream data rate (e.g., data rate from modem 14 to ADSL modem 16) and transmit at the low end of the frequency spectrum to minimize cross-talk. However, these techniques alone have not been adequate to fully compensate for cross-talk noise. One such form of cross-talk noise is near-end cross-talk (e.g., NEXT noise), which must be dealt with adequately or else data can be significantly affected. Near-end cross-talk noise is propagated in a disturbed channel in the direction opposite to the direction of propagation of the signal in the disturbing channel. The terminal of the disturbed channel at which near-end cross-talk noise is present is ordinarily close to, or coincides with, the energized terminal of the disturbing channel. Near-end cross-talk noise becomes a significant problem for modems associated with ADSL modem 16 because downstream data rates are higher and can occur at high frequency signals.

Thus, there is a need for a digital subscriber line (DSL) communication system which reduces near-end cross-talk noise. Further, there is a need for a communication system which reduces near-end cross-talk noise inexpensively, without degrading data rates. Further still, there is a need for a splitterless DSL modem which is less susceptible to errors due to cross-talk noise on the subscriber line.

SUMMARY OF THE INVENTION

The present invention relates generally to a communication system for use with a subscriber line. The communication system includes a customer digital subscriber line modem located at a customer site and a remote or office digital subscriber line modem coupled to the subscriber line. The customer digital subscriber line modem is also coupled to the subscriber line and receives downstream signals in a first frequency band from the subscriber line and transmits upstream signals in a second frequency band to the subscriber line. The office digital subscriber line transmits the downstream signals to the subscriber line in the first frequency band and receives the upstream signals from the subscriber line in the second frequency band. The office subscriber line modem includes a transmitter for providing the downstream signals, an echo canceler, and an analyzer. The echo canceler is coupled to the transmitter and the subscriber line and provides a line signal representing the signals on the subscriber line that have the downstream signals canceled. The analyzer receives the line signal and generates a feedback signal representing preemphasis for the downstream signals in accordance with the line signal. The transmitter adjusts the downstream signals in accordance with the feedback signal.

The present invention further relates to a digital subscriber line modem for use in a communication system that utilizes a subscriber line. The modem includes a transmitter, a receiver, an echo canceler, and an analyzer. The transmitter is coupled to the subscriber line and provides transmit signals in a first frequency range on the subscriber line. The receiver is coupled to the subscriber line and receives receive signals in a second frequency range. The echo canceler is coupled to the subscriber line and the transmitter. The echo canceler provides a canceled signal representing characteristics of the subscriber line without the transmit signals. The analyzer is coupled to the echo canceler and the transmitter. The analyzer generates a feedback signal in accordance with the canceled signal. The transmitter adjusts the transmit signals in accordance with the feedback signal.

The present invention further still relates to a method of reducing cross-talk distortion on a subscriber line utilized in a communication system that includes at least one modem. The method includes providing transmit signals in a first frequency range through an equalizer to the subscriber line, echo-canceling the transmit signals from signals on the subscriber line to generate canceled signals, performing a spectral analysis on the canceled signals to generate a feedback signal, and adjusting the equalizer with a feedback signal to reduce cross-talk distortion. The first frequency range is distinct from the second frequency range for received signals.

According to an exemplary aspect of the present invention, the DSL modem can transmit DSL signals in a first frequency range and can receive DSL signals in a second frequency range in accordance with frequency division multiplexing techniques. The communication system advantageously allows high frequency DSL signals (e.g., over 30 kilohertz (kHz)) to be communicated on a subscriber line without substantial cross-talk distortion or noise. Digital signal-processing techniques are utilized to preemphasize or to prefilter transmitted signals in accordance with the cross-talk noise on the subscriber line. The digital signal-processing techniques can include the performance of spectral analysis in the first frequency range.

In accordance with yet another exemplary aspect of the present invention, the DSL modem includes an echo canceler, a band-pass filter, and an analyzer. The echo canceler removes the transmitted signal from signals derived from the subscriber line. The canceled transmitted signal is band-limited by the band-pass filter to the same band width as the transmitted signal. The analyzer performs spectral analysis on the canceled and filtered signal utilizing a fourier transformation (e.g., FFT). The analyzer can also perform an inverse fourier transformation on the spectral analysis to obtain co-efficients for a preequalization filter. The co-efficients are used to modify the transmitted spectrum such that the transmitter maintains a relatively constant signal-to-noise ratio despite the presence of near-end cross-talk noise.

BRIEF DESCRIPTION OF THE DRAWINGS

The invention will be further described with reference to the accompanying drawings, wherein like numerals denote like elements, and.

DETAILED DESCRIPTION OF PREFERRED EXEMPLARY EMBODIMENTS

Figure 2:
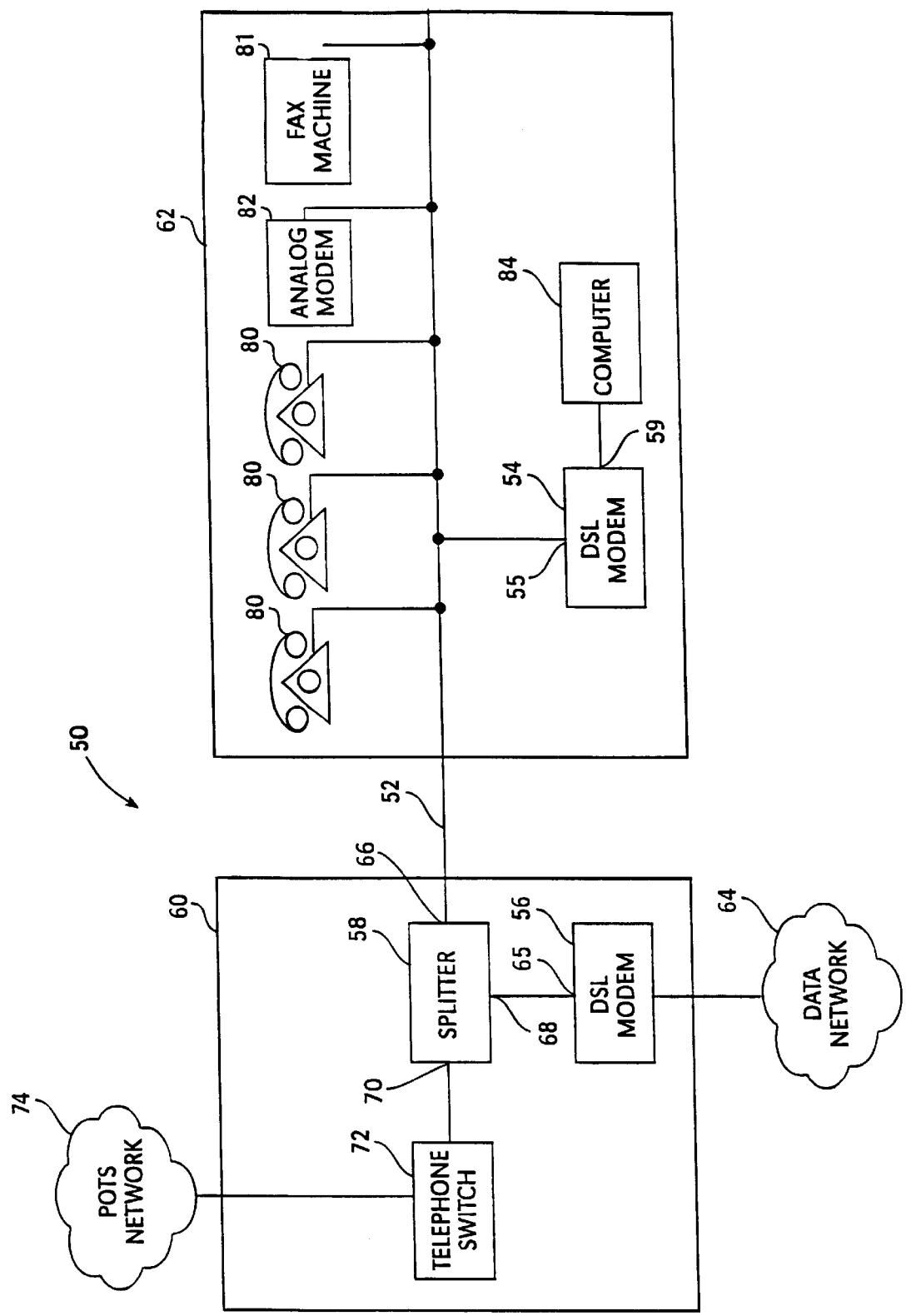
FIG. 2 is a schematic block diagram of a communication system in accordance with an exemplary embodiment of the present invention, the communication system includes a customer DSL modem and an office subscriber line modem in accordance with another exemplary embodiment of the present invention.

With reference to FIG. 2, a DSL communication system 50 includes a copper twisted pair subscriber line 52, a customer or residential DSL modem 54, a remote or central office DSL modem 56, and a band splitter 58. Subscriber line 52 is a local loop, such as, a twisted pair of American wire gauge (AWG) 24 or 26 copper wires, which connects a central office 60 and a residence 62. Residence 62 can also be an office, a building, or other facility. Similarly, central office 60 can be any facility associated with a provider of telephone services.

DSL modem 56 is coupled to a data network 64. Splitter 58 has a signal input 66 coupled to subscriber line 52, a higher-frequency output 68 coupled to a terminal 65 of DSL modem 56, and a lower-frequency output 70 coupled to a telephone switch 72. Telephone switch 72 is coupled to a POTS network 74. DSL modem 56, splitter 58, and telephone switch 72 are preferably located in central office 60. Alternatively, splitter 58 could be included as part of DSL modem 56 (e.g., DSL modem 56 is provided as an in-line device between subscriber line 52 and switch 72).

In residence 62, one or more telephones 80, analog facsimile machine 81, and analog modem 82 can be coupled directly to subscriber line 52 as is well known in the art. Telephones 80 can be any of conventional communication devices, including answering machines, which can be coupled to subscriber line 52 to provide various POTS functions.

DSL modem 54 is coupled directly to subscriber line 52 at a data terminal or digital subscriber line access 55. DSL modem 54 is also coupled to a computer 84. Alternatively, DSL modem 54 could be coupled to other devices (not shown), such as, a network, a server, or other communication or computing device.

Figure 1:
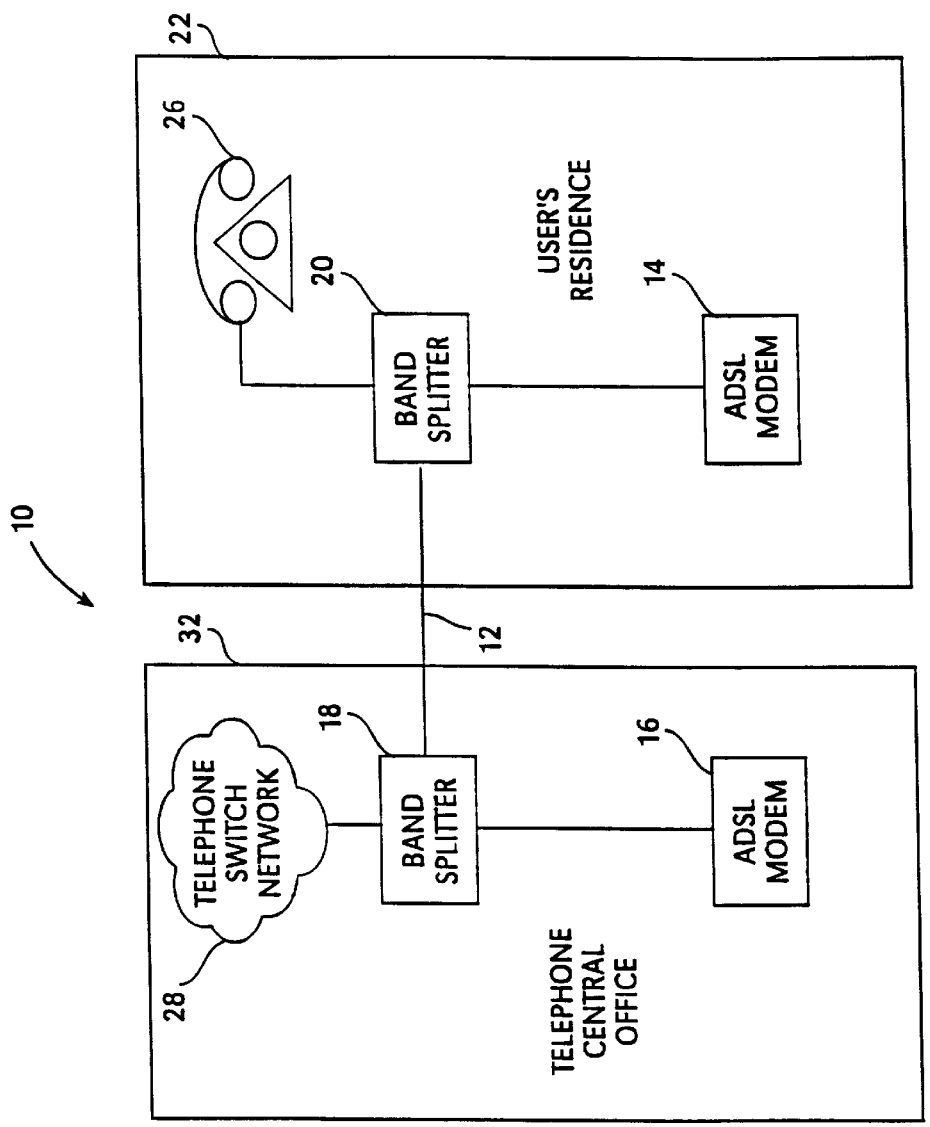
FIG. 1 is a schematic block diagram of a prior art ADSL communication system.

Unlike conventional ADSL communication systems, such as, system 10 described with reference to FIG. 1, DSL modem 54 does not utilize a splitter between modem 54 and subscriber line 52 and between telephones 80 and subscriber line 52. DSL modem 54 eliminates the need for a splitter in residence 62 by advantageously utilizing digital signal-processing techniques to adapt to varying subscriber line characteristics caused by analog equipment, such as, telephones 80, machine 81, and modem 82. DSL modem 54 can operate concurrently with any of telephones 80, machine 81, and analog modem 82.

DSL modem 54 preferably includes digital subscriber line access 55, which is part of a standard connector (e.g., an RJ11 walljack), and is coupled to subscriber line 52 in similar fashion as conventional telephones 80 and analog modems 82. Access 55 is preferably a two-wire terminal.

Figure 3:
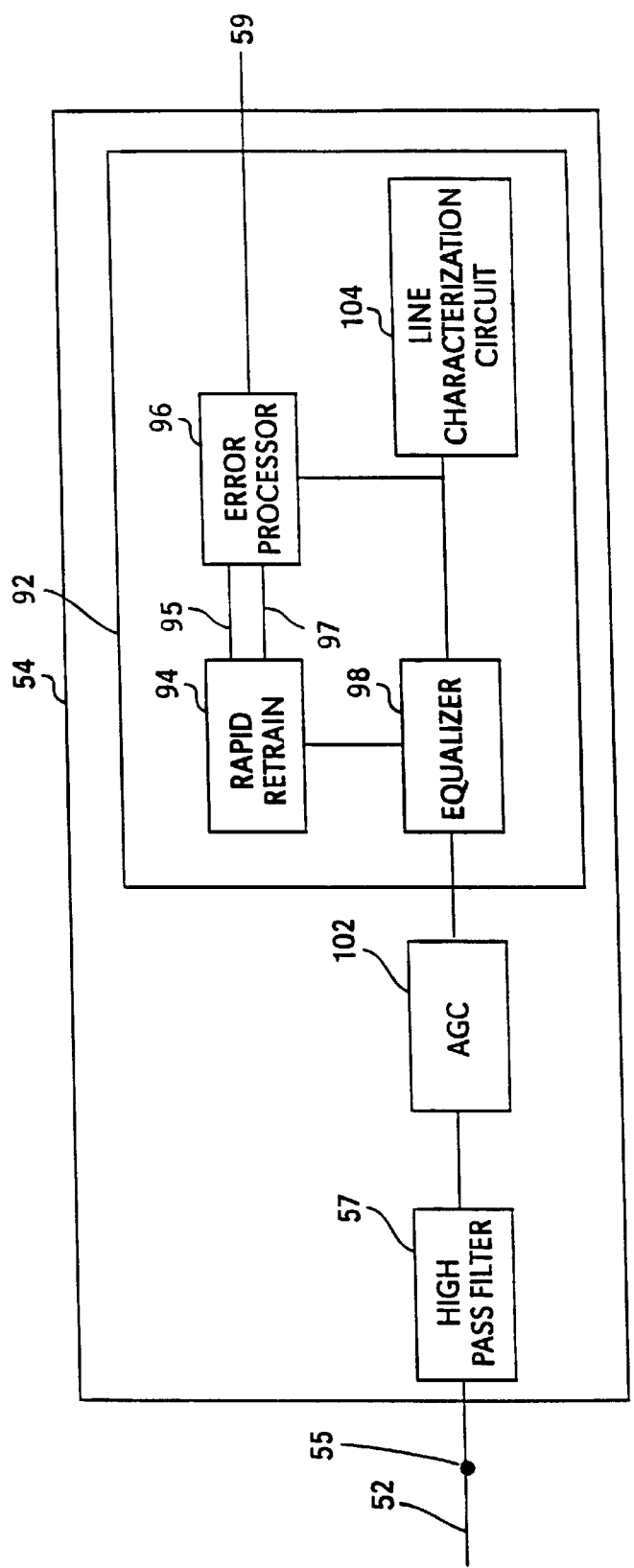
FIG. 3 is a more detailed schematic block diagram of the customer DSL modem illustrated in FIG. 2, wherein the DSL modem includes a control circuit in accordance with yet another exemplary embodiment of the present invention.

Modem 54 can be provided as an internal device in computer 84, such as, on a PCI card, or as an external device. Preferably, modem 54 is an internal device so that high speed communications between modem 54 and computer 84 are not slowed by serial ports associated with computer 84. As an external device, modem 54 could be coupled through a printer port or a universal serial bus (USB) to computer 84. In FIG. 3, modem 54 is coupled to computer 84 via a data terminal 59.

Modem 54 is preferably implemented with a digital signal-processing chip set. Other suitable processors can be utilized to run software modules to implement the operations described in the present application. The software modules implement most tasks associated with modem 54. The tasks include digital filtering, line characterization, modulation, demodulation, gain control, equalization, initialization, error correction, test functions, and other modem requirements.

In operation, modem 54 adjusts operating characteristics, such as, equalization parameters, gain, and data rates, according to variables associated with line 52. Modem 54 is capable of receiving data at least at a one megabit per second (Mbps) data rate when line 52 is approximately 12 kilofeet and when all of telephones 80 are on-hook. Preferably, the reception (downstream) data rate is no worse than a 256 Kbps data rate in the presence of POTS-related impairments associated with telephones 80. Modem 54 is capable of transmitting data at least at a 100 Kbps data rate when line 52 has a length of 12 kilofeet and when all telephones 80 are on-hook. The transmission (upstream) data rate is preferably no worse than a 64 Kbps in the presence of POTS-related impairments. By utilizing lower data rates than maximum ADSL data rates, such as, 6 Mbps, modem 54 can be manufactured less expensively and is more able to withstand POTS-related impairments.

DSL modem 56 is similar to DSL modem 54. However, modem 56 preferably is a lower-power modem to minimize the power consumed by central office 60. Additionally, modem 56 can have a sleep mode so that when modem 56 is not being accessed, significant power is not consumed by modem 56. Modem 56 can have a lower-cost receiver unit (not shown) because upstream data rates are lower than downstream data rates, as discussed above. In the sleep mode, processors and other electronic devices in modem 56 are placed in a low-power or no-power mode by slowing or stopping clock signals within modem 56. If modem 54 is utilized within a laptop computer, lower-power techniques are desirable for modem 54 as well.

Modem 56 preferably includes circuitry (not shown in FIG. 2) for compensating for near-end cross-talk (NEXT) noise. Modem 54 can also include similar compensation circuitry. In accordance with digital signal processing techniques, modem 56 can listen to downstream traffic (e.g., from modem 56 to modem 54) without any transmitted signals from modem 56 to obtain line characterization parameters. Modem 56 then provides the transmitted signals on subscriber line 52 in accordance with the line characterization parameters. For example, modem 56 can prefilter or preemphasize the transmitted signals in response to the line characterization signals.

Modem 54 advantageously utilizes digital signal-processing techniques to characterize and to classify interference sources going both to the POTS portion of the spectrum from the DSL portion of the spectrum and from the POTS portion of the spectrum to the DSL portion of the spectrum. Modem 54 compensates for these interference sources with digital signal processing techniques. For example, when telephone 80 is brought off-hook, an impedance change occurs on line 52. Modem 54 can adjust data rates, gain characteristics, and filter parameters to compensate for the impedance change. Thus, modem 54 can utilize digital signal processing techniques to compensate for interference from POTS equipment, such as, telephone 80. Preferably, the digital signal-processing techniques can rapidly adjust to interference sources so communication latency are not noticeable to the user.

In operation, DSL modems 54 and 56 communicate signals as quadrature amplitude modulated (QAM) signals. Alternatively, the signals can be carrierless amplitude phase (CAP) modulated signals, or discrete multi-tone (DMT) signals. DSL modems 54 and 56 communicate data at various constellation sizes, ranging from 4 to 256 points. The data is transmitted in Reed-Solomon frames, where the R-S code rate is 0.941176471 (K/N) and N=68 and K=64. Alternatively, other values for N and K can be utilized to optimize data and frame rates.

DSL modem 54 transmits upstream signals in a lower-frequency range and receives downstream signals in a higher-frequency range, in accordance with frequency division multiplexing techniques. For example, modem 54 preferably transmits upstream signals at a carrier frequency between a lower band edge of 30 kHz and an upper band edge of 114 kHz. Modem 54 transmits upstream signals at a data rate of 136 Kbps for a constellation sizes of 4 points and at a data rate of 340 Kbps for a constellation size of 32 points. Modem 56 receives the upstream signals at the same rates. Data rates are across channel before error-coding bits (Trellis and Reed-Solomon) are removed.

DSL modem 56 transmits downstream signals at a carrier frequency of between a lower band edge of 240 kHz and an upper band edge of 1 MHz. DSL modem 56 transmits downstream signals at a data rate of 680 Kbps for a constellation size of 4 points and at a data rate of 1.7 Mbps for a constellation rate of 32 points. Alternatively, other carrier frequencies can be utilized for transmitting downstream information. The use of frequency division multiplexing eliminates the need for an echo canceler (not shown), thereby eliminating nonlinear effects of echo-canceling.

The use of frequency division multiplexing also allows for an advantageous compensation circuit (not shown in FIG. 2) to be utilized. By dividing the transmit frequencies and receive frequencies, line 52 can be listened to in the transmit frequency range without receiving a signal from the receive frequency range. A band-pass filter can simply filter out signals outside of the transmit frequency range. Line 52 can be characterized in the transmit frequency as signals are transmitted on line 52. Any signals that remain in the transmit frequency after transmitting signals are echo-canceled are typically due to near-end cross-talk noise. Prefiltering, preequalization, or preemphasis can be performed on transmitted signals to compensate for the cross-talk noise. Additionally, by utilizing lower frequencies for upstream signals (e.g., from modem 54 to modem 56), cross-talk noise is reduced because less data is transmitted upstream. Therefore, the lower frequency range for signals transmitted from modem 54 to modem 56 reduces the amount of cross-talk provided on communication from modem 56 to modem 54 (e.g., downstream).

Modems 54 and 56 can utilize a variety of protocols to transmit and receive upstream and downstream signals. Modems 54 and 56 could additionally utilize an auxiliary channel within a control frequency band for transmitting control information between modems 54 and 56. Modems 54 and 56 can also utilize various error protocol, such as, Reed-Solomon coding, Trellis coding, or other protocols, to gain higher immunity to noise and to other phone line impairments. Trellis coding is an application of convolutional coding which is well known in art.

With reference to FIG. 3, modem 54 includes a high-pass filter 57 coupled between data access 55 which is coupled to subscriber line 52 and a control circuit 92. High-pass filter 57 preferably has a threshold frequency above 4 kHz and beneath the lowest band carrier edge for the DSL signals (e.g., 30 kHz) to prevent POTS signal from entering modem 54. Control circuit 92 includes a rapid retrain module or circuit 94, an error processor 96, a line characterization module or circuit 104, and an equalizer 98. Additionally, an automatic gain control circuit (AGC) 102 is disposed between high-pass filter 57 and equalizer 98.

Circuit 102 can be an analog circuit. Alternatively, circuit 102 can be a digital circuit located in control circuit 92 or a hybrid analog and digital circuit. Filter 57 can be a passive filter with a threshold frequency of 10 kHz.

Equalizer 98 is a digital filter through which signals are transmitted and received to and from line 52. Equalizer 98 can be on a receive side of control circuit 92, a transmit side of control circuit 92, or both. Equalizer 98 is an adaptive compensation circuit for counteracting distortions on line 52.

Equalizer 98 is preferably a decision feedback equalizer defined by tap coefficients. Equalizer 98 is implemented by a digital signal processor (not shown), running a software program. In the receive mode, equalizer 98 provides filtered signals to error processor 96 as well as other portions of control circuit 92. The filtered signals are processed by circuit 92 and provided at data terminal 59. In the transmit mode, other filters or equalizers (not shown) can filter or preemphasize signals provided by circuit 92 to line 52.

Equalizer 98 must be converged (e.g., tuned) so the constellation associated with QAM signals are appropriately situated for decoding. Alternatively, equalizer 98 can be any device, digital or analog, for reducing frequency or phase distortion, or both, on subscriber line 52 by the introduction of filtering to compensate for the difference in attenuation or time delay, or both, at various frequencies in the transmission and reception spectrums.

Rapid retrain circuit 94 provides control signals (e.g., tap coefficients) to equalizer 98 to converge equalizer 98, thereby compensating for distortion on line 52. Rapid retrain circuit 94 causes equalizer 98 to converge in response to a raise-rate rapid retrain signal provided by error processor 96 on a line 97. Rapid retrain circuit 94 also causes equalizer 98 to converge in response to a lower-rate rapid retrain signal provided by error processor 96 on a line 95. Rapid retrain circuit 94 can utilize tap coefficients developed by line characterization circuit 104. As discussed in more detail below, circuit 104 can store a number of coefficients for known error conditions in a flash memory or in other storage devices. Alternatively, the coefficients can be interactively determined, as discussed below.

Error processor 96 monitors signals from equalizer 98 to determine if significant errors in the communication of data on line 52 are occurring. If significant errors are occurring, a lower-rate rapid retrain signal is provided on line 95 so rapid retrain circuit 94 retrains modem 54. If few errors are occurring, and data is communicated at a lower data rate, a raise-rate rapid retrain signal is provided on line 97 so circuit 94 retrains modem 54 to communicate data at a higher rate.

As part of the retrain operation, modem 54 performs a variety of tasks to ensure accurate data communication. A retrain operation for modem 54 can include the following tasks: reacquiring timing from a remote modem, such as, modem 56, converging equalizer 98, and adjusting the data rate. Additionally, the retrain operation can also include characterizing line 52 and adjusting the automatic gain control circuit 102. Depending on modem 54 and on line 52 parameters, circuit 94 can perform different levels of retrain operations.

In a slow retrain or initialization operation, a retrain operation from initiation variables (e.g., scratch) of modem 54 can include reacquiring timing, characterizing line 52, adjusting circuit 102 from initialization variables, converging equalizer 98 from initialization variables, and determining a data rate. Characterizing line 52 can involve performing line characterization routines by circuit 104, as discussed below. Since adjusting circuit 102 and converging equalizer 98 are interactive processes, these procedures can be time-consuming. The slow retrain can take as long as 6.5 seconds. Nonetheless, time is saved, even in the slow retrain operation, when compared to conventional modems because modem 54 advantageously does not utilize an echo canceler (not shown). The echo canceler typically must be reset during a retrain operation.

To save time, a rapid retrain operation can eliminate one or more of the above steps or can perform the above steps from predicted variables (variables which are initially closer to the desired value than initialization variables). In a rapid retrain operation, the line characterization step is eliminated, and circuit 102 and equalizer 98 are adjusted slightly or converged from a stored coefficient. For example, according to a rapid retrain operation, the center tap coefficient for equalizer 98 can be determined, and the remaining coefficients can be adjusted based on the difference between the determined center tap coefficient and the previous center tap coefficient.

According to another rapid retrain operation, prestored tap coefficients are utilized so equalizer 98 does not have to be significantly converged. The tap coefficients are chosen based upon conditions recognized by circuit 94, such as, telephone 80 (FIG. 2) being brought off-hook. The adjustment of the gain circuit 102 can be restricted to a range to save time.

System and application parameters associated with modem 54 and line 52 can define the amount of time required for a rapid retrain of modem 54. For example, a rapid retrain may occur in a particular amount of real time, such as, less than 0.5 seconds. A rapid retrain within 0.5 seconds assures that the transmission of data is not affected for perceivable delays as modem 54 is retrained. A 0.5 second retrain operation is a vast improvement over the conventional 6.5 seconds for initialization retrain operations. Alternatively, the rapid retrain operation may occur in a much shorter time period, particularly if error processor 96 and rapid retrain circuit 94 are able to determine what changes on subscriber line 52 have caused errors. Circuit 94 can react to those changes and access a database or other data indicative of coefficients for equalizer 98, gain parameters for circuit 102, data rates, or other criteria for appropriate communication of data on line 52. For example, such a database could be stored on computer 84 coupled to modem 54 (FIG. 2). Further still, a very rapid retrain operation could occur where equalizer 98 does not have to be converged, and only the gain of circuit 102 needs to be adjusted. Thus, rapid retrain circuit 94 is capable of retraining modem 54 in a rapid manner in response to error processor 96, discovering that there are errors in the communication of data on subscriber line 52.

When rapid retrain circuit 94 performs a retrain operation, data rates associated with modem 54 are adjusted to maximize the data rate, while maintaining the integrity of the communication. For instance, if error processor 96 determines that a particular number of errors are occurring, rapid retrain circuit 94 may adjust the data rate down, thereby reducing the size of the constellation. Error processor 96 can determine errors which require an adjustment of equalizer 98, such as, tangential error, radial error, or other errors. Error processor 96 can also react to Trellis-coding errors, Reed-Solomon errors, mean-squared error levels, or other errors. Alternatively, if error processor 96 determines that the mean-squared error level is below a threshold, rapid retrain circuit 94 can retrain modem 54 and adjust the data rate upward by increasing the size of the constellation. The threshold used to compare the mean-squared error, as well as other errors, is variable according to user parameters and to the data rate.

Line characterization circuit 104 can perform a variety of operations to characterize line 52 for the development of tap coefficients for equalizer 98 and of other parameters for modem 54. Line characterization tests can be performed when modem 54 is at initialization, in an idle mode, or in a non-idle mode.

According to one example of a line characterization test, tones or test patterns are transmitted across line 52 in accordance with a test protocol. Modems 54 and 56 (FIG. 2) cooperate to determine characteristics of line 52 based upon received tones or test patterns. In a non-idle mode, the test pattern can be sent and analyzed during the time the user is awaiting communications from the Internet. Further, a separate control channel can be utilized to send control information necessary to characterize line 52. In an idle mode, the test pattern can be sent and analyzed when modem 54 is not in a communication mode (e.g., before modem 54 enters a communication mode).

In another embodiment, circuit 104 can enter a learn mode and analyze line 52 under a variety of conditions. While in the learn mode, the user can bring telephone 80 (FIG. 2) off-hook in response to instructions generated by software on computer 84. Modem 54 can characterize line 52 during those particular conditions. Coefficients for equalizer 98 can be generated for those conditions and stored for a rapid retrain operation. Further still, circuit 104 can perform line-probing operations similar to the V.34 standard.

In yet another embodiment, an echo canceler can be utilized on a transmit side of modem 54 to remove the transmitted signals in the transmit frequency spectrum. Control circuit 92 can analyze the characteristics in the transmit frequency spectrum of line 52. This analysis can be performed during idle and non-idle modes, as explained below with reference to FIGS. 6 and 7. Modem 54 can be configured so control circuit 92 is similar to the control circuit illustrated in FIG. 6.

The portion of equalizer 98 on the transmit side can be adjusted according to the analysis to predistort or to preemphasize the transmitted signals. Digital frequency processing techniques can also include various error signal analysis, correction, and manipulation to determine when a rapid retrain is necessary as well as techniques for rapidly converging an equalizer associated with modem 54.

Figure 4:
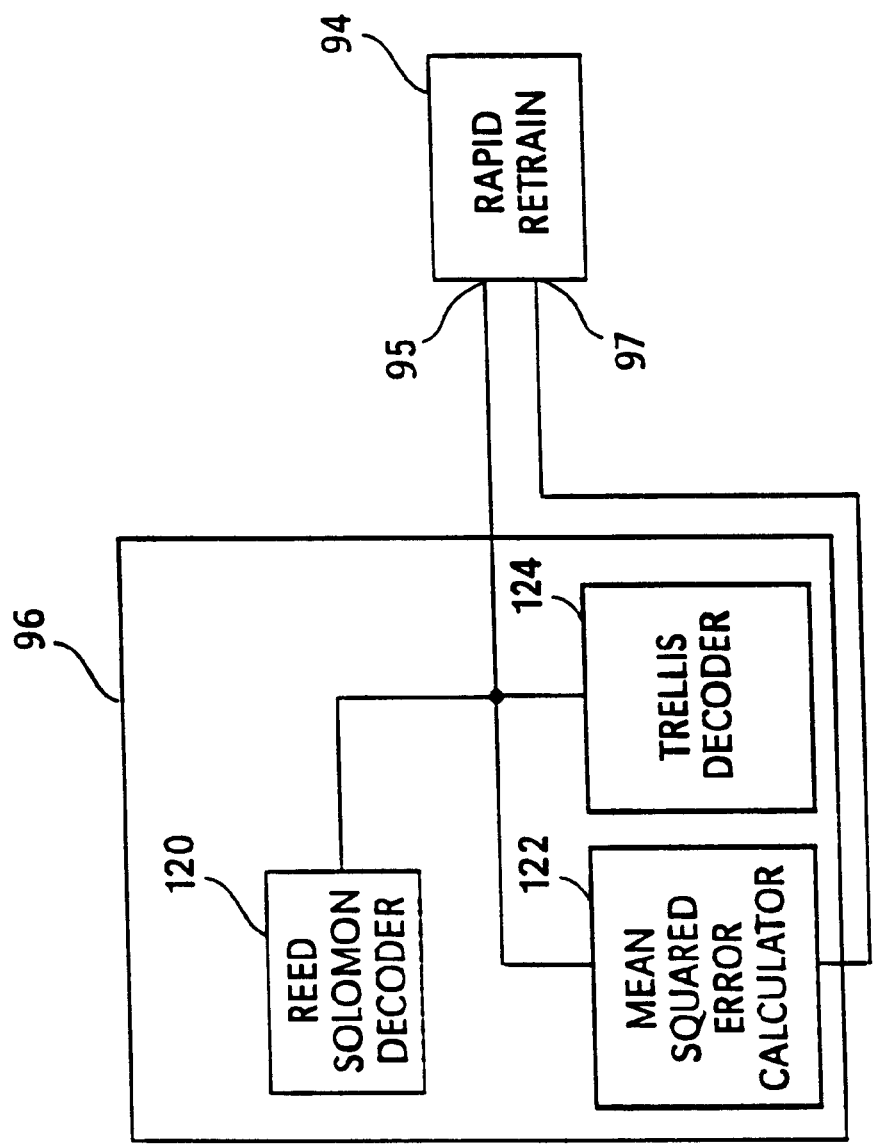
FIG. 4 is a more detailed schematic block diagram of the control circuit illustrated in FIG. 3.

With reference to FIG. 4, error processor 96 includes a Reed-Solomon decoder 120, a mean-squared error calculator 122, and a Trellis error decoder 124. Processor 96 can also include a Verterbi error circuit (not shown). Reed-Solomon decoder 120 analyzes frames of data provided from error decoder 124 and determines both if a frame error occurs and if errors are occurring in the frame. Reed-Solomon decoder 120 can correct errors as is well known in the art.

Reed-Solomon decoder 120, calculator 122, and Trellis error decoder 124 provide a lower-grate rapid retrain signal when error conditions indicate that the data rate should be lowered. Rapid retrain circuit 94 performs a rapid retrain operation and lowers the data rate in response to the lower rate rapid retrain signal at input 95. In contrast, when mean-squared error calculator 122 provides a raise-rate rapid retrain signal at input 97, rapid retrain circuit 94 raises the data rate and performs a rapid retrain. Thus, modem 54 automatically raises or lowers its data rate to maintain high-speed and accurate communication in the presence of POTS-related impairments.

Although the data rates associated with modems 54 and 56 are somewhat lower than maximum data rates associated with conventional ADSL systems, these data rates are still significantly higher than conventional analog modem capabilities. The lower data rates allow modems 54 and 56 to use smaller constellation sizes and frequency division multiplexing, as well as withstand POTS-related impairments.

Digital signal-processing techniques can include rapid retrain operations where the modem is adjusted to changing subscriber line techniques due to POTS operations. Such adjustments can include adjusting automatic gain control circuit 102, converging equalizer 98, and error processing. Further, digital signal-processing techniques can include line characterization techniques performed by circuit 104 (FIG. 3).

Figure 5:
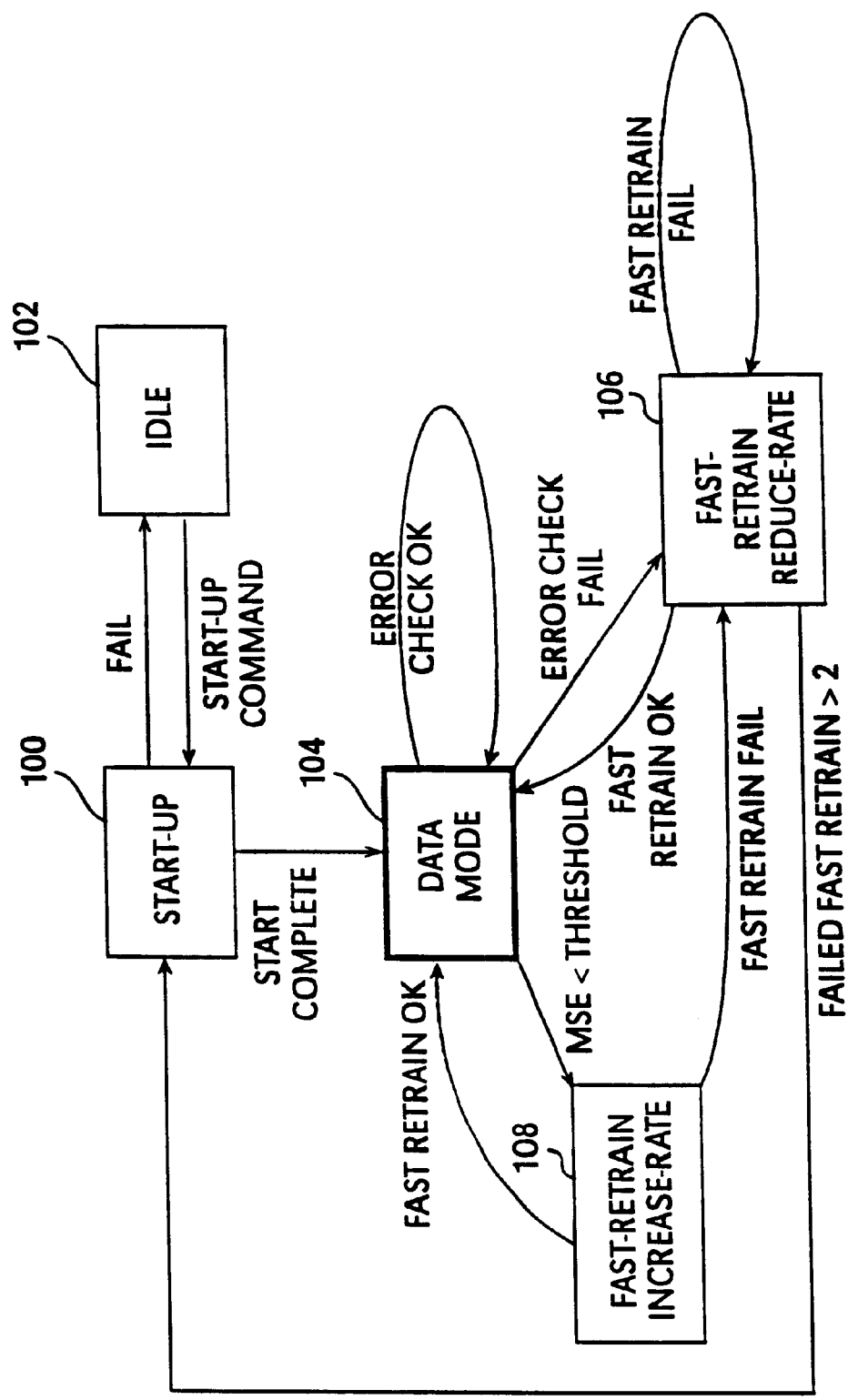
FIG. 5 is a state diagram showing an example of the operation of the customer DSL modem illustrated in FIG. 3.

With reference to FIG. 5, operation of modem 54 is described with reference to FIGS. 2–5. FIG. 5 is a state diagram showing rapid retrain operations for modem 54. Modem 54 preferably always provides the highest data rate available on line 52, according to a rate-adaptive digital subscriber line technique. Modem 56 should have the ability to set a maximum downstream data rate so that the telephone company can limit the maximum downstream data rate to avoid advantaging subscribers who live close to office 60. According to the technique, modems 54 and 56 constantly adjust the data rates to reach maximum data rate potential on subscriber line 52 (FIG. 2).

In FIG. 5, modem 54 (FIG. 2) is capable of a start-up state 100, an idle state 102, a data mode state 104, a fast-retrain reduce-rate state 106, and a fast-retrain increase-rate state 108. When off or idle, modem 54 transfers from idle state 102 to start-up state 100, when it receives a start-up command.

In start-up state 100, modem 54 is initialized. During initialization, timing is acquired from a remote modem, such as, modem 56, automatic gain circuit 102 is adjusted, equalizer 98 is converged, the carrier phase is locked, line 52 is characterized, and a data rate is selected. If start-up is successfully completed, modem 54 advances to data mode state 104, where data is communicated across subscriber line 52.

As data is communicated at the data rate selected during start-up state 100, error signals from error processor 96 are consistently checked. If the error signals are within an acceptable level, modem 54 is maintained in data mode state 104. However, if the error signals are above a particular level, modem 54 enters fast-retrain reduce-rate state 106. In state 106, modem 54 reduces the data rate, adjusts automatic control circuit 102, reacquires timing, and converges equalizer 98. Preferably, equalizer 98 is retrained from stored coefficient values to reduce the amount of time required for retraining. Alternatively, another mode (not shown) may be entered where just the automatic gain control 102 (FIG. 3) is adjusted, and the data rate is not changed to compensate for errors.

In state 106, if the fast retrain fails, another fast retrain is attempted. If more than two fast retrain attempts fail, modem 54 returns to start-up state 100. As at initialization, if start-up state 100 fails, modem 54 enters idle state 102.

If the fast retrain operation is successfully completed, modem 54 returns to data mode state 104 and continues to communicate data at a lower data rate. The data rate can be adjusted incrementally or by other relationships. For example, if the errors are due to known POTS activity, particular data rates may be known to operate during that activity, and those data rates may be chosen.

In state 104, if the mean-squared error signal provided by mean-squared error calculator 122 is below a threshold, modem 54 enters fast-retrain increase-rate state 108. Alternatively, other indications of signal-to-noise ratio can be utilized instead of the mean-squared error signal. Modem 54 is retrained in state 108 similarly to state 106, except that the data rate is increased. If the fast-retrain operation is completed successfully, modem 54 changes from state 108 to state 104 and continues normal data communication operations at the faster rate. If the fast retrain operation fails in state 108, modem 54 enters state 106 and performs a fast-retrain reduce-rate operation.

Figure 6:
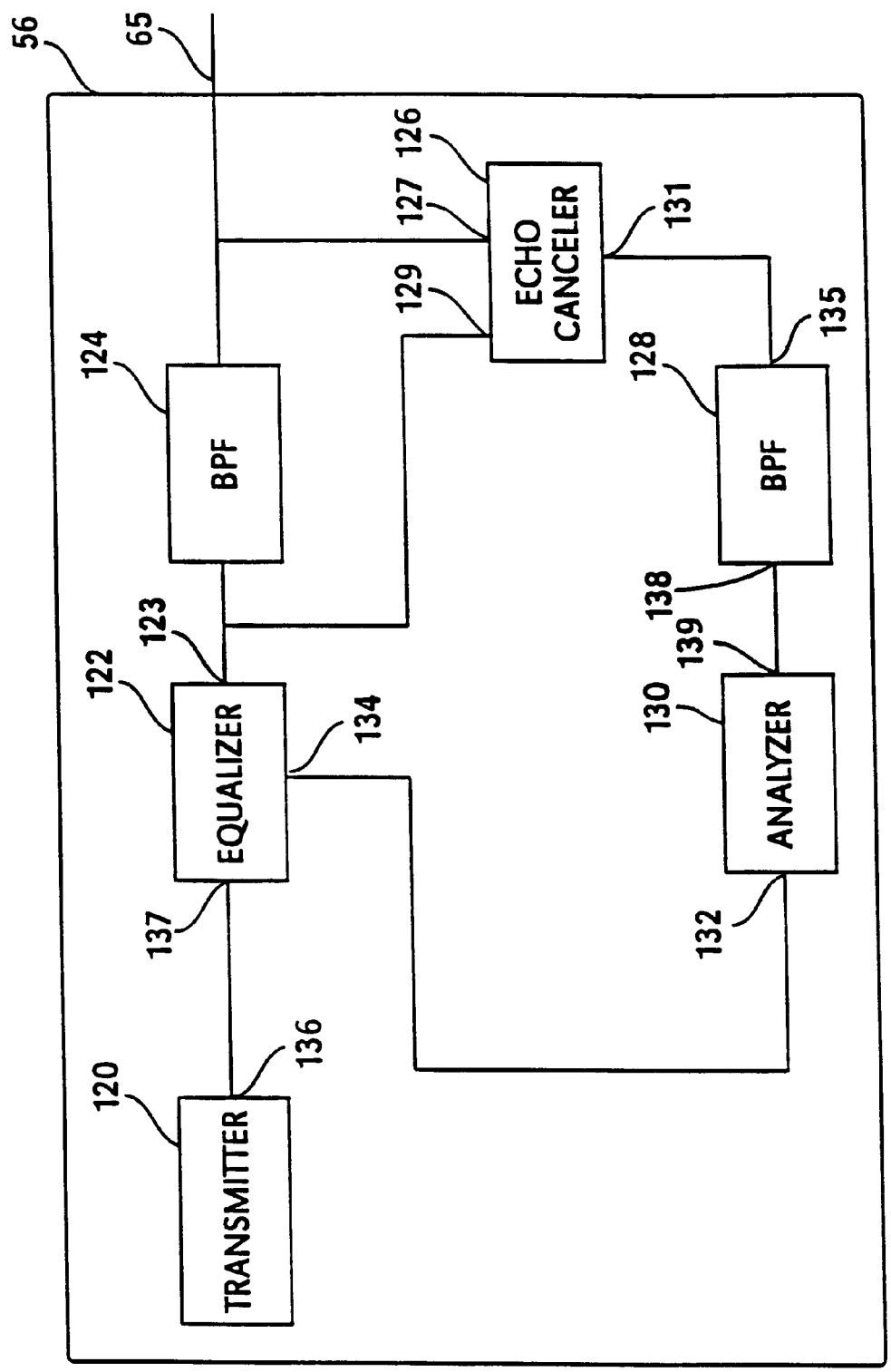
FIG. 6 is a more detailed schematic block diagram of the office DSL modem illustrated in FIG. 2.

With reference to FIG. 6, modem 56 includes a transmitter 120, a terminal or digital subscriber line access 65, an equalizer 122, a band-pass filter 124, an echo canceler 126, a band-pass filter 128, and an analyzer 130. Portions of the transmit section of modem 56 are shown to describe the advantageous cross-talk distortion compensation features of the present application. A transmitter section similar to the transmitter section of modem 56 illustrated in FIG. 6 can also be utilized with modem 54.

Access 65 is coupled to band-pass filter 124 and to a first input 127 of echo canceler 126. A second input 129 of echo canceler 126 is coupled to an output 123 of equalizer 122. The output 123 of equalizer 122 is also provided to band-pass filter 124. Echo canceler 126 has an output 131 coupled to an input 135 of band-pass filter 128.

An output 138 of band-pass filter 128 is coupled to an input 139 of analyzer 130. Analyzer 130 has a control output 132 coupled to a control input 134 of equalizer 122. Transmitter 120 has an output 136 coupled to an input 137 of equalizer 122. Equalizer 122 can be a portion of an equalizer similar to equalizer 98 disposed in modem 54, as discussed with reference to FIG. 3. Alternatively, equalizer 122 can be separate and distinct from other filters or equalizers associated with modem 56.

In operation, transmitter 120 provides data signals, such as, QAM signals, at output 136 to input 137 of equalizer 122. Equalizer 122 prefilters or preconditions the transmitted QAM signals and provides the filtered QAM signals at output 123. Band-pass filter 124 further filters the QAM signals and provides the QAM signals to access 65, where they are provided to line 52.

Band-pass filter 124 preferably has a frequency response associated with the frequency range corresponding to downstream signals (e.g., between 240 kHz and 1 MHz). Band-pass filter 124 prevents equalizer 122 from providing signals outside of the downstream frequency range from reaching access 65 and hence line 52. Additionally, band-pass filter 124 can prevent signals outside of the downstream frequency range from reaching input 129 of echo canceler 126.

Echo canceler 126 receives signals on line 52 through access 65 at input 127. The signals received at input 127 allow echo canceler 126 to receive signals from all frequency ranges associated with line 52. Echo canceler 126 provides echo-canceled signals representing the signals on subscriber line 52 minus the signals provided at equalizer output 123 (e.g., the signals on line 52 with the transmitted signals from equalizer 122 canceled). The echo-canceled signals at output 131 are then filtered in band-pass filter 128 to remove signals outside of the downstream frequency range. Band-pass filter 128 is preferably tuned to the downstream frequency range.

Analyzer 130 analyzes the filtered, echo-canceled signal to determine the characteristics of line 52 that are associated with distortions, such as, cross-talk noise. The cross-talk noise is often in the frequency range of the transmitted signals and, therefore, cannot easily be removed by filtering with passive devices. Analyzer 130 preferably performs a fast Fourier transformation of the frequency response on line 52 to generate an analysis signal. An inverse fast Fourier transformation on the analysis signal then provides filter coefficients at control output 132 to control input 134 of equalizer 122. In this way, analyzer 130 causes equalizer 122 to predistort, preemphasize, or prefilter the signals at output 136 to compensate for cross-talk distortion.

Modem 56 can be implemented by a variety of circuit components. Preferably, modem 56 is implemented by a digital signal processor operating software. Equalizer 122 is preferably a digital filter implemented by the digital signal processor.

Figure 7:
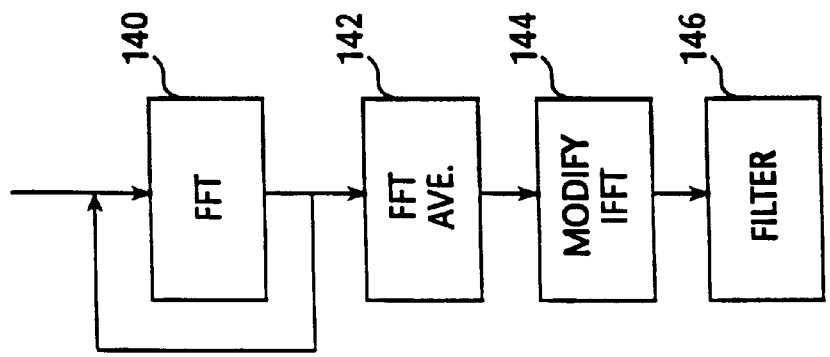
FIG. 7 is a flow diagram illustrating the transmission operation of the remote DSL circuit illustrated in FIG. 6.

With reference to FIG. 7, the operation of modem 56 illustrated in FIG. 6 is described as follows. Analyzer 130 preferably performs a fast Fourier transformation on samples of echo-canceled signals from line 52 at a step 140. Preferably, step 140 is repeated to obtain a fast Fourier transfer average computed at a step 142. The average is preferably comprised of overlapped and integrated samples of various frequency ranges on line 52. Alternatively, analyzer 130 can perform wavelet analysis. Analyzer 130 can also be a bank filter which is provided tones at selected frequencies (e.g., a sliding filter).

At a step 144, an inverse fast Fourier transformation (IFFT) is performed on the FFT average to obtain filter coefficients. The filter coefficients are applied to equalizer 122 at a step 146. Analyzer 130 can perform steps 140–146 dynamically, at initialization, or in response to retrain signals, as discussed with reference to FIGS. 3–5.

Thus, echo canceler 126 can be utilized to minimize NEXT distortion in a frequency division multiplexed modem, such as, modem 56. The transmitted signals are canceled from the office side of line 52 by a near-end echo canceler, such as, canceler 126. The canceled transmitted signal is band-limited by filter 128 to the same band width as the transmitted signal. Spectral analysis of the output 138 of band-pass filter 128 is performed by utilizing a Fourier transformation, such as, an FFT. Preferably, the analysis is averaged and overlapped to reduce reactions to random anomalies on line 52.

An inverse FFT is performed on the spectral analysis to obtain coefficients for a preequalization filter, such as, equalizer 122. Preferably, the coefficients cause equalizer 122 to maintain a constant signal-to-noise ratio for the transmitted signals in the presence of the NEXT distortion.

It is understood that, while the detailed drawings and specific examples given describe preferred exemplary embodiments of the present invention, they are for the purpose of illustration only. The apparatus and method of the invention is not limited to the precise details and conditions disclosed. For example, although QAM signals and frequency division multiplexing is utilized, other protocols can be implemented. Also, although parameters related to specific frequency ranges are discussed, other frequency ranges could be utilized. Various changes may be made to the details disclosed without departing from the spirit of the invention which is defined by the following claims.

What is claimed is:

1. A communication system for use with a subscriber line, the communication system comprising:

a customer digital subscriber line modem, located at a customer site, coupled to the subscriber line, the customer digital subscriber line modem receiving downstream signals in a first frequency band from the subscriber line and transmitting upstream signals in a second frequency band to the subscriber line; and an office digital subscriber line modem coupled to the subscriber line, the office digital subscriber line transmitting the downstream signals to the subscriber line in the first frequency band and receiving the upstream signals from the subscriber line in the second frequency band, the office digital subscriber line modem including a transmitter for providing the downstream signals, an echo canceler, and an analyzer, the echo canceler being coupled to the transmitter and the subscriber line, the echo canceler providing a line signal representing the signals on the subscriber line that have the downstream signals canceled, the analyzer receiving the line signal and generating a feedback signal representing preemphasis for the downstream signals in accordance with the line signal, the transmitter adjusting the downstream signals in accordance with the feedback signal.

2. The modem of claim 1, wherein the transmitter adjusts the downstream signals in response to the feedback signal to reduce near-end cross-talk distortion on the subscriber line.

3. The modem of claim 1 further comprising: a band-pass filter coupled between the subscriber line and the echo canceler, the band-pass filter being tuned to the first frequency band.

4. The modem of claim 3, wherein the band-pass filter prevents the upstream signals from reaching the echo canceler.

5. The modem of claim 1, wherein the transmitter includes an equalizer providing the downstream signals, whereby the feedback signal adjusts the equalizer to reduce near-end cross-talk distortion on the subscriber line.

6. The modem of claim 5, wherein the analyzer performs spectral analysis on the line signal to generate the feedback signal.

7. The modem of claim 6, wherein the spectral analysis includes performing a fourier transformation on the line signal, and performing an inverse fourier transformation to generate filter coefficients as the feedback signal.

8. A digital subscriber line modem for use in a communication system including a subscriber line, the modem comprising:

a transmitter coupled to the subscriber line, the transmitter providing transmit signals in a first frequency range on the subscriber line;

a receiver coupled to the subscriber line, the receiver receiving receive signals in a second frequency range;

an echo canceler coupled to the subscriber line and the transmitter, the echo canceler providing a canceled signal representing characteristics of the subscriber line without the transmit signals; and an analyzer coupled to the echo canceler and the transmitter, the analyzer generating a feedback signal in accordance with the canceled signal, whereby the transmitter adjusts the transmit signals in accordance with the feedback signal.

9. The modem of claim 8, wherein the transmitter adjusts the transmit signals in response to the feedback signal to reduce near-end cross-talk distortion on the subscriber line.

10. The modem of claim 8 further comprising:

a first band-pass filter coupled between the subscriber line and the echo canceler, the first band-pass filter having a center frequency within the first frequency range; and a second band-pass filter coupled between the echo canceler and the analyzer, the second band-pass filter also having a center frequency within the first frequency range.

11. The modem of claim 8, wherein the transmitter includes an equalizer filter providing the transmitter signals, whereby the feedback signal adjusts the equalizer filter to reduce cross-talk distortion on the subscriber line.

12. The modem of claim 11, wherein the equalizer filter has a response controlled by filter co-efficients, wherein the feedback signal provides the filter coefficients.

13. The modem of claim 12, wherein the analyzer performs spectral analysis to generate the feedback signal.

14. The modem of claim 13, wherein the spectral analysis includes performing both a fourier transformation and an inverse fourier transformation.

15. A method of reducing cross-talk distortion on a subscriber line utilized in a communication system including at least one modem, the method comprising:

providing transmit signals in a first frequency range through an equalizer to the subscriber line, the first frequency range being distinct from a second frequency range for received signals;

echo-canceling the transmit signals from signals on the subscriber line to generate canceled signals;

performing a spectral analysis on the canceled signals to generate a feedback signal; and adjusting the equalizer with the feedback signal to reduce cross-talk distortion.

16. The method of claim 15, wherein the cross-talk distortion is near-end cross-talk distortion.

17. The method of claim 15 further comprising:

filtering the signals on the subscriber line to remove the receive signals.

18. The method of claim 15, wherein the spectral analysis includes performing both a fourier transformation and an inverse fourier transformation to generate filter coefficients, wherein the feedback signal includes the filter coefficients.

19. The method of claim 15, wherein the transmit signals are quadrature amplitude modulation signals.

20. The method of claim 19, wherein the modem is an asymmetric digital subscriber line modem.

* * * * *